United States Patent Office 3,729,466
Patented Apr. 24, 1973

---

3,729,466
21-FLUORO DERIVATIVES OF 3β-HYDROXY-Δ⁴,⁶-HALO-20-OXO-PREGNADIENES
Georg Anner, Basel, and Peter Wieland, Oberwil, Switzerland, assignors to Ciba-Geigy Corporation, Ardsley, N.Y.
No Drawing. Filed Apr. 13, 1971, Ser. No. 133,736
Claims priority, application Switzerland, Apr. 17, 1970, 5,793/70
Int. Cl. C07c *173/00*
U.S. Cl. 260—239.55 D          17 Claims

ABSTRACT OF THE DISCLOSURE 21-fluoro-steroid derivatives 3-hydroxy-Δ⁴,⁶-6-fluoro or 6-chloro-20-oxo-pregnadienes oxygenated in the 16- and 17-position have anti-inflammatory, gestagenic and anti-ovulatory activity. The compounds are prepared in a manner known per se.

---

The present invention provides new halogen steroids of the pregnane series, and especially those of the formula

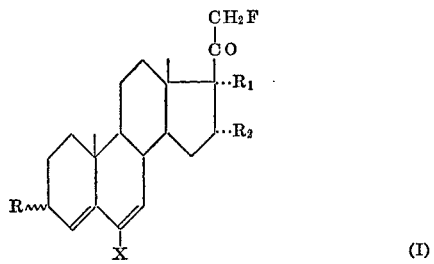

in which R represents a free, esterified or etherified hydroxyl group, $R_1$ and $R_2$ each represent a free, esterified or etherified hydroxyl group and $R_1$ together with $R_2$ represents the group

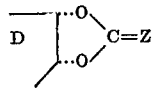

in which Z represents two aliphatic, aromatic or araliphatic hydrocarbon residues or the group C=Z represents a cycloalkylidene group, and X represents a fluorine or chlorine atom.

The said esterified hydroxyl groups are more especially derived from saturated or unsaturated carboxylic acids of the aliphatic, aromatic or heterocyclic series, and especially those containing 1–18 carbon atoms, for example, formic acid, acetic acid, propionic acid, a butyric acid, a valeric acid, such as n-valeric acid, or trimethyl-acetic acid, trifluoracetic acid, a caproic acid, such as β-trimethylpropionic acid or diethyl-acetic acid, an oenanthic, caprylic, pelargonic, capric or undecylic acid, for example, undecylenic acid, or a lauric, myristic, palmitic or stearic acid, for example, oleic acid, or a cyclopropane, cyclobutane, cyclopentane or cyclohexane carboxylic acid, for example, cyclopropyl-methane carboxylic acid, cyclobutyl-methane carboxylic acid, cyclopentyl-ethane carboxylic acid, cyclohexyl-ethane carboxylic acid, benzoic acid, or derived from phenoxyalkanoic acids, such as phenoxyacetic acid, or from dicarboxylic acids, such as succinic acid, phthalic acid, or quinolinic acid, furane-2-carboxylic acid, 5-tert.-butyl-furane-2-carboxylic acid, 5-bromofurane-2-carboxylic acid, nicotinic acid or isonicotinic acid, or from sulphonic acids, such as benzene sulphonic acids, or from inorganic acids, for example, phosphoric or sulphuric acids.

An etherified hydroxyl group is especially a hydroxyl group derived from an alcohol containing 1–8 carbon atoms, for example, a lower aliphatic alkanol, such as ethyl alcohol, methyl alcohol, propyl alcohol, isopropyl alcohol, a butyl or amyl alcohol, or from araliphatic alcohols, especially monocyclic aryl-lower-aliphatic alcohols, such as benzyl alcohol, or from heterocyclic alcohols, such as α-tetrahydropyranol or -furanol.

The two hydrocarbon residues of the group Z may be identical or different, saturated or unsaturated, straight-chain or branched, and are preferably lower-alkyl groups, such as methyl, ethyl, propyl, isopropyl, butyl, tert.-butyl, phenyl, tolyl or xylyl groups, the benzyl group or phenylethyl group. The cycloalkylidene group C=Z is more especially one derived from a 5- or 6-membered cycloaliphatic ketone, such as cyclopentanone or cyclohexanone, that is to say, a cyclopentylidene or cyclohexylidene group, or a derivative thereof that is unsaturated and/or substituted by alkyl groups, for example, methyl groups.

Among the new compounds there may be mentioned more especially Δ⁴,⁶-6,21-difluoro-3,16,17-trihydroxy-20-oxo-pregnadiene and Δ⁴,⁶-chloro-21-fluoro 3,16,17-trihydroxy-20-oxo-pregnadiene and their 16- or 17-esters of lower aliphatic carboxylic acids, for example, acetic, propionic, trimethylacetic, valeric or caproic acids, or corresponding 16, 17-diesters, their 16- or 17-monoethers derived from lower aliphatic alcohols, or the corresponding 16, 17-diethers, and especially their 16, 17-acetonides and 16, 17-ketals of cyclopentanone and cyclohexanone, and also the 3-esters or 3-ethers of the above mentioned acids or alcohols, respectively.

The new compounds possess valuable pharmacological properties. In addition to a gestagenic and ovulation-inhibiting action, they exhibit, more especially, a pronounced anti-inflammatory action both when administered systemically and topically, as has been found in animal tests. When administered per os the compounds in the raw-wadding granuloma test on male rats are active at doses of about 1 mg. per kilogram, and when administered topically in the same test at doses of 0.003 mg. per animal. When administered subcutaneously in the Clauberg test to rabbits a progestagenic action occurs at doses of about 0.003 mg. per kilogram and the inhibition of ovulation occurs in rats at doses of about 0.03–1 mg. per kilogram.

Thus, for example, the Δ⁴,⁶-6-chloro-21-fluoro-3β,16α,17α-trihydroxy-20-oxo-16,17-acetonide, when administered topically, exhibits a good anti-inflammatory action in the raw-wadding granuloma test on male rats at doses of 0.01 mg. per animal, whereas, when administered per os, a good anti-inflammatory action occurs at doses of 3 mg. per kilogram. In rabbits, when administered subcutaneously, a pronounced gestagenic action occurs at doses of 0.01 mg. per kilogram, and a strong inhibition of ovulation occurs at 0.1 mg. per kilogram, when administered subcutaneously. When administered per os, a good ovulation-inhibiting action is noted at doses of 0.1 mg. per kilogram.

The new compounds are therefore suitable as anti-inflammatory agents and for the control of fertility.

The new compounds are also intermediate products for the manufacture of other useful substances, especially pharmacologically active compounds.

The compounds can be made by methods in themselves known. The process of the present application is more especially characterised in that a compound of the formula

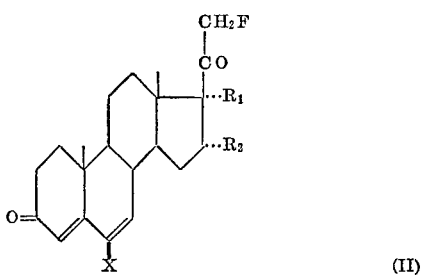

(II)

in which $R_1$ and $R_2$ and X have the meanings given in connection with Formula I, is treated with a reducing agent that converts the 3-oxo group into a 3-hydroxyl group while retaining nuclear double bonds, and, optionally and in either order of succession, esterified hydroxyl groups in the resulting compound are liberated or ketals are split up, and/or optionally a compound so obtained which contains at least one free hydroxyl group in the 3, 16 and 17-position is esterified or etherified, and/or 16, 17-diols are converted into 16, 17-ketals, and optionally into the 3-esters or ethers of such ketals.

As reducing agents, that convert the 3-oxo group into a 3-hydroxy group while retaining the nuclear double bonds, there are preferably used complex light metal hydrides, for example, alkali metal-aluminium hydrides, such as lithium-, sodium- or potassium-aluminium hydride or mild-acting alkali metal or alkaline earth metal boron hydrides or lithium-trialkoxy-boron or -aluminium hydrides, for example, lithium, sodium or potassium boron hydride, lithium-trimethoxy-, -triethoxy- or -tri-tert. butoxy-aluminium hydride or calcium boron hydride.

With the above mentioned hydrides the reaction is carried out in a manner in itself known. For example, when the reduction is carried out with lithium-aluminium hydride, ethers are used as solvents, and preferably tetrahydrofurane; the boron hydrides are preferably used in lower alkanols, such as methanol, ethanol, propanol or butanol. Hydrocarbons, such as those of aromatic character, for example, benzene or toluene, may also be used as solvents.

When there are used the more strongly acting of the above mentioned reducing agents such, for example, as the alkali metal-aluminium hydrides, it is of advantage to work with stoichiometric quantities of the reducing agents. With milder reducing agents such, for example, as alkali metal boron hydrides in alcohol, the 20-oxo-group is hardly attacked at all when the reaction period is short, so that the selective reduction in the 3-position takes place with good yields.

The optional esterification or etherification of at least one of the hydroxyl groups in the 3, 16 and 17 positions and also the ketalisation of the 16- and/or 17-hydroxyl groups are also carried out in a manner in itself known. The steroid-alcohols are reacted, for example. With reactive functional derivatives of acids, especially those mentioned above, such as anhydrides or acid halides, preferably in the presence of a tertiary base such as pyridine. For preparing the 16, 17-ketals, for example, the acetonides or cyclopentanone ketals or cyclohexanone ketals, the free 16, 17-diols are reacted with the corresponding ketones in the presence of an acid, such as hydrochloric acid or perchloric acid or a sulphonic acid, for example, p-toluene sulphonic acid, in a suitable solvent, such as a hydrocarbon or chlorinated hydrocarbon, an amide, such as dimethylformamide, or an alcohol. The formation of the ketals can also be carried out by reacting the 16, 17-diols with ketals of the appropriate ketones, such as the dimethyl- or diethyl-ketals.

The optional liberation of esterified hydroxyl groups or the splitting of 16, 17-ketals is preferably carried out by acid hydrolysis, for example, by the action of hydrochloric acid in methanol.

The starting materials used in the process are known or can be made by methods in themselves known, for example, as described in United States patent application Ser. No. 133,699, filed Apr. 13, 1971. Preferably the starting compounds are obtained by introducing the $\Delta^6$-6-chloro- or $\Delta^6$-6-fluoro groups by a method in itself known into a compound of the formula

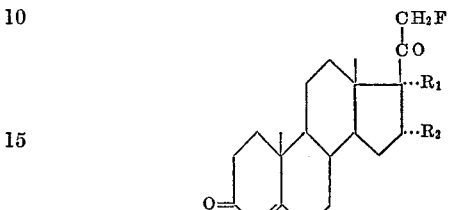

(III)

in which $R_1$ and $R_2$ have the meanings given in connection with Formula I, and optionally converting in the compounds so obtained in any order of succession 16, 17-diols into their 16- or 17-monoesters or 16- or 17-monoethers or into the 16, 17-diesters or 16, 17-diethers or into the 16, 17-ketals. The compounds of the Formula III can be made with advantage by converting a compound of the formula

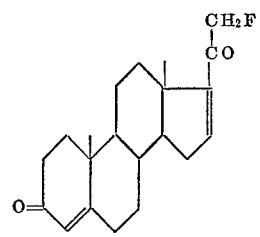

into the corresponding 16, 17-saturated 16, 17-dihydroxy compound or an ester thereof, and optionally liberating esterified or etherified hydroxyl groups, or splitting up ketals, and/or optionally converting in the compound obtained at least one free hydroxyl group in the 16, 17-position into a 16- or 17-monoester or a 16- or 17-monoether or into a 16, 17-diester or 16, 17-diether or into a 16, 17-ketal. The 16, 17-dehydro compound of the above formula can be obtained with advantage in accordance with the process described in our application No. 241/70 of Jan. 9, 1970. That process comprises reacting a steroid of the following partial formula

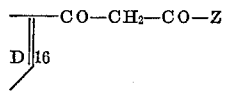

in which Z represents hydrogen or an esterified carboxyl group, with an agent capable of transferring diazo groups, reacting the resulting 21-diazo-20-ketone of the partial formula

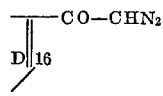

with hydrogen fluoride, and, optionally, converting at any stage functionally converted hydroxyl groups into free hydroxyl groups or converting free hydroxyl groups into functionally converted hydroxyl groups. Agents capable of transferring diazo groups are primarily sulphonylazides, for example, p-tosyl-azide or p-carboxylphenyl-sulphonyl azide. The reaction with these agents is preferably carried out in the presence of a base, for example, strong organic bases, such as triethylamine, or inorganic bases, such as sodium hydride, and the reaction is carried out in a hydrocarbon, such as benzene or toluene, chloroform or methylene chloride. The reaction of the resulting diazo-ketone with hydrogen fluoride is carried out in a solvent which is inert towards the diazo-function, for example, a tertiary alcohol. Starting, for example, from $\Delta^{5,16}$-3β-acetoxy-20-oxo-pregnadiene there can be obtained in good yield by this method $\Delta^{5,16}$-3β-hydroxy-20-oxo-21-fluoropregnadiene, which is first oxidised in the 3-position by the method of Oppenauer, and is then reacted with osmium tetroxide to form $\Delta^4$-16,17-dihydroxy-3,20-dioxo-21-fluoropregnene.

The invention also includes those forms of the process in which there is used as starting material a compound obtained as an intermediate product in any stage and the remaining stages are carried out, or in which a starting material is formed under the conditions of the reaction.

The present invention also includes the manufacture of pharmaceutical preparations for use in human and veterinary medicine, which preparations contain as active substances the new pharmacologically active substances described above together with a pharmaceutical carrier. As carriers there are used organic or inorganic substances which are suitable for enteral, for example, oral, parenteral or topical administration. For preparing the carriers there are used substances which do not react with the new compounds, for example, water, gelatine, lactose, starches, magnesium stearate, talc, vegetable oils, benzyl alcohols, gums, polyalkylene glycols, white petroleum jelly, cholesterol and other known carriers for medicaments. The pharmaceutical preparations may be in solid form, for example, as tablets, dragées or capsules, or in liquid or semi-liquid form as solutions, suspensions, emulsions, salves or creams. If desired, these pharmaceutical preparations may be sterilised and/or may contain auxiliary substances, such as preserving, stabilising, wetting or emulsifying agents, salts for regulating the osmotic pressure or buffers. They may also contain other therapeutically valuable substances. The new compounds may also serve as starting materials for the manufacture of other valuable compounds.

The compounds of the invention can also be used as additions to food.

The following example illustrates the invention:

EXAMPLE 1

To a solution of 1.97 grams of 3,20-dioxo-6-chloro-16α,17α-dihydroxy - 21-fluoro - $\Delta^{4,6}$-pregnadiene-16,17-acetonide in 197 ml. of tetrahydrofurane are added, while stirring, in a current of nitrogen 3.3 grams of lithium tri-tertiary-butoxy-aluminium hydride. 35 minutes later 120 ml. of a saturated solution of Rochelle salt are slowly added, while cooling with ice, and then extracted several times with methylene chloride. After washing with a saturated solution of Rochelle salt, the mixture is dried and evaporated in vacuo. The residue is chromatographed on 10 plates of silicagel to 1 m. in the system toluene-acetone 9:1. The main zone is removed, and eluted with ethyl acetate, then washed with water, dried and evaporated in vacuo. By crystallising the residue from a mixture of methylene chloride and ether there is otbained 3β-hydroxy-6-chloro - 16α,17α - dihydroxy-20-oxo-21-fluoro-$\Delta^{4,6}$-pregnadiene-16,17-acetonide melting at 212–213.5° C.

By acetylation with pyridine-acetic anhydride there is obtained 3β-acetoxy-6-chloro-16α,17α-dihydroxy-20-oxo-21-fluoro-$\Delta^{4,6}$-pregnadiene-16,17-acetonide melting at 93–94° C.

EXAMPLE 2

1.48 g. of succinic acid anhydride are added in an atmosphere of nitrogen to a solution of 649 mg. of 3β-hydroxy-6-chloro-16α,17α-dihydroxy-20-oxo-21 - fluoro-$\Delta^{4,6}$-pregnadiene 16, 17-acetonide in 3.7 ml. of pyridine. After having heated the mixture for 17 hours in a sealed recipient at 50° the contents is poured on 40 ml. of water and stirred for 30 minutes. The batch is then extracted with toluene, washed with water, dried and evaporated in vacuo. The residue is recrystallized from methylene-chloride-ether and there is obtained the 3-hemisuccinate of the 3β-hydroxy-6-chloro-16α,17α - dihydroxy-20-oxo-21-fluoro-$\Delta^{4,6}$-pregnadiene-16, 17-acetonide melting at 211–212°.

We claim:
1. Compounds of the formula

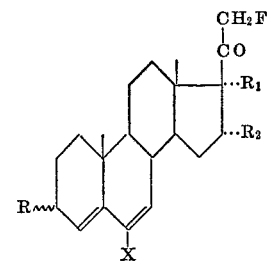

(I)

wherein R represents a member selected from the group consisting of a free, an esterified and an etherified hydroxyl group, $R_1$ and $R_2$ each represent a member selected from the group consisting of a free, an esterified and an etherified hydroxyl group and $R_1$ together with $R_2$ represents the group

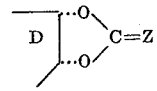

in which Z represents two aliphatic, aromatic or araliphatic hydrocarbon residues each having 1 to 8 carbon atoms or the group C=Z represents a cycloalkylidene group derived from a 5- or 6-membered cycloaliphatic ketone, and X represents a member selected from the group consisting of fluorine or chlorine atom, each of said esterified hydroxyl groups being derived from an aliphatic, aromatic or heterocyclic carboxylic acid having from 1–18 carbon atoms and each of said etherified hydroxyl groups being derived from an alcohol having from 1 to 8 carbon atoms.

2. Compounds as claimed in claim 1, wherein any esterified hydroxyl group derives from an aliphatic, aromatic or heterocyclic carboxylic acid having from 1–18 carbon atoms.

3. Compounds as claimed in claim 1, wherein any esterified hydroxyl group derives from a lower aliphatic carboxylic acid.

4. Compounds as claimed in claim 1, wherein any etherified hydroxyl group is derived from an alcohol having from 1 to 8 carbon atoms.

5. Compounds as claimed in claim 1, wherein any etherified hydroxyl group is derived from tetrahydropyranol.

6. Compounds as claimed in claim 1, wherein 16, 17-ketals are derived from lower aliphatic ketones.

7. Compounds as claimed in claim 1, wherein 16, 17-ketals are derived from cyclopentanone or cyclohexanone.

8. A compound as claimed in claim 1, which is the $\Delta^{4,6}$-6-chloro-21-fluoro - 3α,16α,17α - trihydroxy-20-oxo-pregnadiene.

9. A compound as claimed in claim 1, which is the $\Delta^{4,6}$-6,21 - difluoro-3β,16α,17α-trihydroxy-20-oxo-pregnadiene.

10. A compound as claimed in claim 1, which is a 3-lower aliphatic carboxylic acid ester of the compound of claim 2.

11. A compound as claimed in claim 1, which is a 3-lower aliphatic acid ester of the compound of claim 3.

12. A compound as claimed in claim 1, which is the 16, 17-acetonide of compound of claim 8.

13. A compound as claimed in claim 1, which is the 16, 17-acetonide of the compound of claim 3.

14. A compound as claimed in claim 1, which is a 3-lower aliphatic carboxylic acid ester of the compound of claim 12.

15. A compound as claimed in claim 1, which is a 3-lower aliphatic carboxylic acid of the compound of claim 12.

16. A compound as claimed in claim 1, which is the 3-acetate of the compound of claim 12.

17. A compound as claimed in claim 1, which is the 3-hemisuccinate of the compound of claim 12.

No references cited.

ELBERT L. ROBERTS, Primary Examiner

U.S. Cl. X.R.

260—239.55 R, 397.47; 424—241